United States Patent
Lottes et al.

(10) Patent No.: US 7,052,772 B2
(45) Date of Patent: May 30, 2006

(54) MATERIAL FOR PACKAGING ELECTRONIC COMPONENTS

(75) Inventors: Andrew C. Lottes, Austin, TX (US);
Mark A. Roehrig, La Mesa, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 187 days.

(21) Appl. No.: 10/640,912

(22) Filed: Aug. 14, 2003

(65) Prior Publication Data

US 2005/0037218 A1    Feb. 17, 2005

(51) Int. Cl.
B32B 18/00    (2006.01)
B32B 27/08    (2006.01)
B32B 27/30    (2006.01)
B32B 27/32    (2006.01)
B32B 27/36    (2006.01)

(52) U.S. Cl. .................. 428/480; 428/457; 428/458; 428/461; 428/463; 428/483; 428/515; 428/520; 428/522; 428/523; 428/688; 428/689; 428/702; 428/918

(58) Field of Classification Search .............. 428/457, 428/458, 461, 469, 471, 472, 480, 36.6, 36.7
See application file for complete search history.

(56) References Cited

U.S. PATENT DOCUMENTS

| | | | | | |
|---|---|---|---|---|---|
| 4,387,133 | A | * | 6/1983 | Ichikawa et al. | 428/215 |
| 4,699,830 | A | * | 10/1987 | White | 428/35.3 |
| 4,842,893 | A | | 6/1989 | Yializis et al. | |
| 4,954,371 | A | | 9/1990 | Yializis | |
| 5,032,461 | A | | 7/1991 | Shaw et al. | |
| 5,084,356 | A | * | 1/1992 | Deak et al. | 428/458 |
| 5,440,446 | A | | 8/1995 | Shaw et al. | |
| 5,719,705 | A | * | 2/1998 | Machol | 359/581 |
| 5,725,909 | A | | 3/1998 | Shaw et al. | |
| 5,756,171 | A | * | 5/1998 | Moteki et al. | 428/36.6 |
| 5,792,550 | A | * | 8/1998 | Phillips et al. | 428/336 |
| 5,853,862 | A | * | 12/1998 | Murai et al. | 428/215 |
| 5,895,723 | A | * | 4/1999 | Utz | 428/480 |
| 5,939,205 | A | * | 8/1999 | Yokoyama et al. | 428/474.4 |
| 6,045,864 | A | | 4/2000 | Lyons et al. | |
| 6,224,948 | B1 | | 5/2001 | Affinito | |
| 6,231,939 | B1 | | 5/2001 | Shaw et al. | |
| 6,351,068 | B1 | | 2/2002 | Yamazaki | |
| 6,395,209 | B1 | * | 5/2002 | Yoshida et al. | 264/137 |
| 6,432,516 | B1 | * | 8/2002 | Terasaki et al. | 428/195.1 |
| 6,576,294 | B1 | * | 6/2003 | Phillips et al. | 427/255.5 |
| 6,749,940 | B1 | * | 6/2004 | Terasaki et al. | 428/425.8 |
| 6,921,788 | B1 | * | 7/2005 | Izawa et al. | 524/430 |
| 2001/0038894 | A1 | * | 11/2001 | Komada | 428/34.6 |
| 2002/0022156 | A1 | * | 2/2002 | Bright | 428/698 |

(Continued)

FOREIGN PATENT DOCUMENTS

JP    2000238177    9/2000

(Continued)

*Primary Examiner*—Vivian Chen
(74) *Attorney, Agent, or Firm*—Melanie G. Gover; Yen Tong Florczak

(57) ABSTRACT

The present invention provides a material for packaging electronic components. In one embodiment, the packaging material comprises (a) a puncture resistant film having opposed first and second major surfaces; (b) a substantially continuous metal free light transmissible layer disposed on the first surface of the puncture resistant film, wherein the light transmissible layer comprises at least one pair of polymer layer and transparent conductive oxide layer; and (c) a heat sealable layer disposed on the light transmissible layer or on the second surface of the puncture resistant film. Other embodiments are provided.

10 Claims, 1 Drawing Sheet

U.S. PATENT DOCUMENTS

2003/0044552 A1* 3/2003 Komada ............... 428/35.7
2003/0068459 A1* 4/2003 Yializis ............... 428/41.5
2003/0068534 A1* 4/2003 Ohkawa et al. ............ 428/701
2004/0194967 A1* 10/2004 Jaensch ................ 166/380

FOREIGN PATENT DOCUMENTS

JP          2002019045       1/2002
WO          WO 00/26973      5/2000

* cited by examiner

MATERIAL FOR PACKAGING ELECTRONIC COMPONENTS

FIELD OF THE INVENTION

The present invention relates to a packaging material useful for electronic components that shields against static electricity and provides a barrier against moisture vapor and oxygen. The packaging material is sufficiently light transmissible so as to allow for the detection of the electronic component using various detection devices. In particular, the packaging material uses a combination of a polymer and a transparent conductive oxide layer to function as the barrier layer and the conductive layer.

BACKGROUND

Materials useful for packaging electronic components preferably exhibit certain properties. For example, the packaging material should provide dissipation of static electricity and shielding from static discharges and electric fields that may be generated, e.g., when the electronic component moves inside the package or when the packaging material is rubbed against other materials. The packaging material should also function as a barrier against moisture vapor and oxygen to protect the electronic component from degradation while it is being stored. While it is not a requirement of the packaging material, it is usually desirable for it not to be opaque, as a consumer of the electronic component would want to ensure that the proper component is used for the intended application.

While there are variations on the construction of packaging materials for electronic components, many share certain common features. For example, it is typical for the packaging material to contain a carrier or a substrate that provides the overall integrity and strength of the packaging material. In many constructions, the substrate is metalized. That is, on at least one of its surfaces, the substrate can be coated with a conductive metal layer. Typically, the metal has been sputter coated or vacuum deposited onto the substrate. Typical metals include, but are not limited to, aluminum, cadmium, chromium, copper, lead, nickel, zinc, and combinations thereof. Perhaps the most commonly used metal is aluminum. When these metal layers are used as the conductive layer, the packaging material, in its overall construction, can transmit some visible light, i.e., it can exhibit some transparency. It is well known, however, that as one increases the thickness of the metalized layer, the transparency of the construction is reduced. One reason why it may be desirable to increase the thickness is to increase the construction's performance against moisture vapor and oxygen ingress. Another reason may be to increase the conductive performance of the construction. Some constructions also include antistatic coatings, typically as the coating exposed to the atmosphere and/or to the electronic component.

While the technology of the prior art may be useful, other constructions for materials useful for packaging electronic components are desired.

SUMMARY

Disclosed herein are packaging materials useful for containing electronic components, where the packaging material need not contain a metalized conductive layer. That is to say, disclosed packaging materials need not contain a metal layer, including such metals as aluminum, cadmium, chromium, copper, lead, nickel, zinc, and combinations thereof, that has been, e.g., sputter coated or vacuum deposited on to a substrate. Instead, the present invention relies on the use of a transparent conductive oxide (TCO) layer and a polymer layer, the combination of these layers forming a light transmissible layer and functioning as the conductive layer and as the barrier layer to moisture vapor and oxygen. Although the packaging material need not contain a metalized conductive layer, it may contain one, if desired, typically not in the light transmissible layer.

In one exemplary embodiment, the packaging material comprises: (a) a puncture resistant film having opposed first and second major surfaces; (b) a substantially continuous metal free light transmissible layer disposed on the first surface of the puncture resistant film, wherein the light transmissible layer comprises at least one pair of polymer layer and transparent conductive oxide layer; and (c) a heat sealable layer disposed on the light transmissible layer or on the second surface of the puncture resistant film. As used in this document, the term "disposed on" means generally that a particular layer is placed on another layer but direct contact of the two layers is not necessary and there could be an intervening layer between the two layers. For example, in the above embodiment where the light transmissible layer is disposed on the first surface of the puncture resistant film, it is within the scope of the present invention to have an intervening layer, e.g., a primer layer, between the light transmissible layer and the puncture resistant film.

In another exemplary embodiment, the packaging material comprises: (a) a puncture resistant film comprising a polyester layer disposed on a polyethylene layer; and (b) a substantially continuous metal free light transmissible layer disposed on the polyester layer of the puncture resistant film, wherein the light transmissible layer comprises at least one pair of polymer layer and transparent conductive oxide layer.

There are several advantages to the various embodiments of the present invention. For example, the inventive packaging material provides good shielding of the electronic component from static electricity and from moisture vapor and oxygen. The inventive article balances the shielding properties with transparency so as to allow one to track the electronic component, e.g., tracking visually or tracking with a detection device such as a laser reader.

The packaging materials of the present invention can be used to package a variety of electronic components, especially ones that need shielding from static electricity, moisture vapor, and oxygen. Illustrative electronic components would include, but are not limited to, integrated circuit chips, hard disk drives, semiconductors and other discharge- or moisture- and/or oxygen-sensitive components.

In this document, the term, "about" is presumed to modify all numerical values.

BRIEF DESCRIPTION OF THE DRAWINGS

The present invention can be described with reference to the following figures, wherein.

These figures are idealized, not drawn to scale and are intended for illustrative purposes.

DETAILED DESCRIPTION

Figure 1:
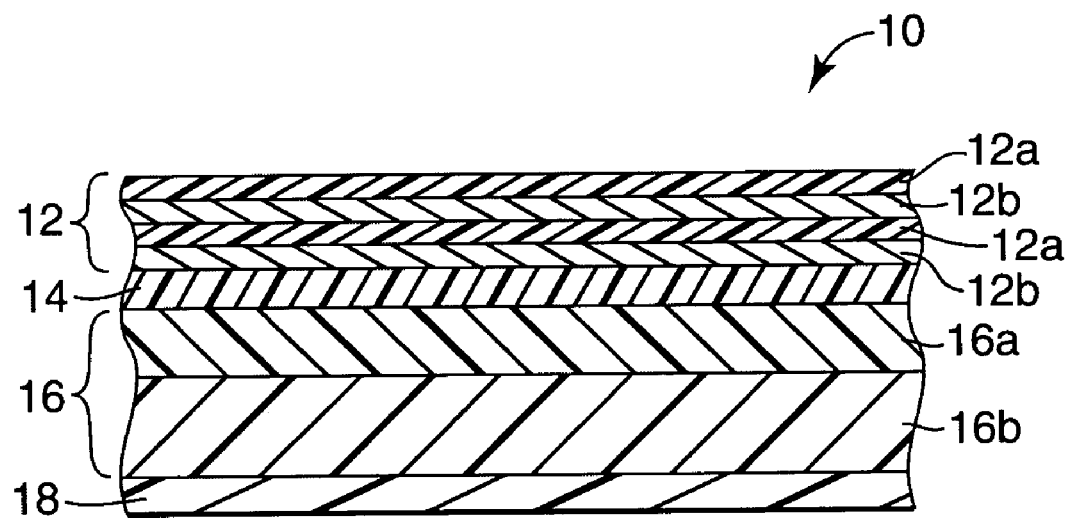
FIG. 1 is a cross-sectional view of a portion of one embodiment of a packaging material.

FIG. 1 is a schematic cross-sectional view of one exemplary embodiment of the present invention showing packaging material 10 having light transmissible layer 12, optional base coating 14, substrate 16, which is a puncture resistant film, and optional antistatic coating 18. The light transmissible layer has a multi-layer construction and contains at least one pair of polymer layer 12a and transparent conductive oxide (TCO) layer 12b. Although FIG. 1 shows two pairs in the light transmissible layer, one skilled in the art will recognize that any number of pairs can be used, as desired. In this particular embodiment, the substrate is a multi-layer construction having a first film 16a and second film 16b. In one embodiment, the first film is polyester and the second film is polyethylene. The base coat, if used, is sandwiched between the light transmissible layer and the substrate such that the base coat contacts the TCO layer. The antistatic coating, if used, is disposed on exposed side of second film of 16b of the substrate. In this embodiment, light transmissible layer 12 is the outermost layer, i.e., the layer exposed to the atmosphere and antistatic coating 18 is the innermost layer, i.e., the layer exposed to the electronic component. The entire thickness of the embodiment of FIG. 1, when the base coat and the antistatic coating are used, is 0.002 to 0.005 inch (50 to 130 micrometer). The total thickness of a particular embodiment would depend on the intended application for the packaging material.

Figure 2:
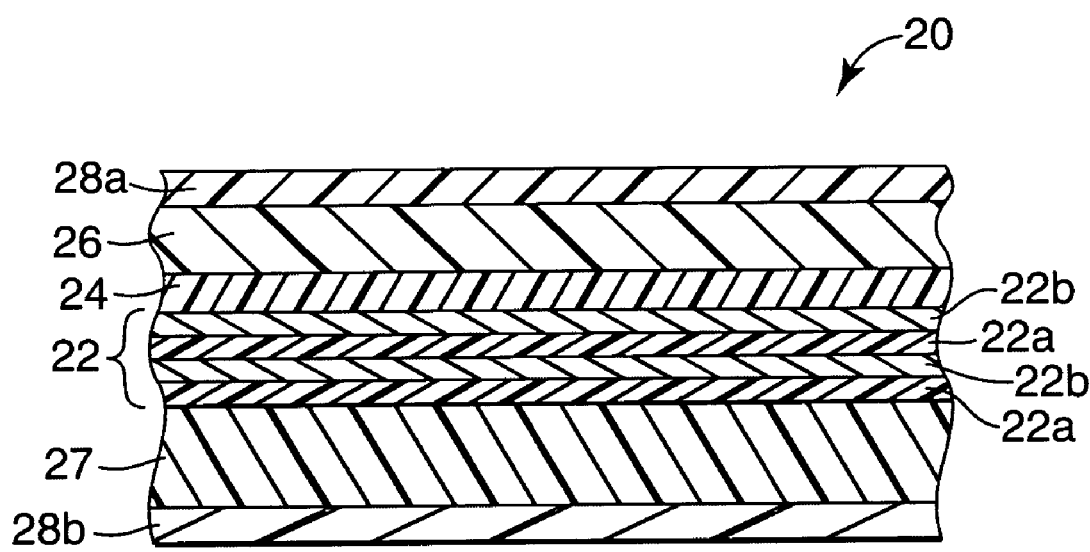
FIG. 2 is a cross-sectional view of a portion of another embodiment of a packaging material.

FIG. 2 is a cross-sectional view of another exemplary embodiment of the present invention showing packaging material 20 having optional antistatic coatings 28a and 28b, substrate 26, which is a puncture resistant film, optional base coat 24, light transmissible layer 22, containing at least one pair of polymer layer 22a and transparent conductive oxide 22b, and heat sealable layer 27. In this particular embodiment, antistatic coating 28a would be the outermost layer while antistatic coating 28b would be the innermost layer. Like the embodiment of FIG. 1, when the base coat is used, it is sandwiched between the light transmissible layer and the substrate such that the base coat contacts the TCO layer. The entire thickness of the embodiment of FIG. 2, when the base coat and the antistatic coatings are used, is 0.002 to 0.005 inch (50 to 130 micrometer). Again, the total thickness of a particular embodiment would depend on the intended application for the packaging material.

As further described below, the packaging material of the present invention is light transmissible. In general, a "light transmissible" packaging material is one whose transmission and haze are sufficiently low to permit viewing of the electronic component or object contained in the packaging material with the unaided eye and/or with the use of a detection device, such as a bar code reading device. In one exemplary embodiment, the minimum transparency value is 40%, as measured by a transmission reflection densitometer. In another exemplary embodiment, the material has a minimum transparency value of 80%, as measured by a transmission reflection densitometer. Because different types of bar coders that are available in the market place, the light transmission requirements of the packaging material may vary from one application to another.

The packaging material also has a maximum moisture vapor transmission rate of 0.05 grams per 100 in$^2$ of surface area in a 24-hour period, as measured by ASTM 1249 "Standard Test Method for Water Vapor Transmission Rate Through Plastic Film and Sheeting Using a Modulated Infrared Sensor". In one embodiment, the surface resistance of the packaging material without any antistatic coating on the outermost layer is 4×10$^{11}$ ohms. In another embodiment, the surface resistance of the inner most layer of the packaging material having an antistatic coating thereon is 1×10$^{11}$ ohms when a standard quaternized amine antistatic agent is used. In yet another embodiment, the resistivity of the TCO layer is les than 100 ohms per square. In yet another embodiment, the static shielding of the packaging material is less than 50 nJ as measured by ESD 11.31, "ESD Association Standard for Evaluating the Performance of Electronic Discharge Shielding Materials: Bags." One skilled in the art will recognize that the resistance value and static shielding value of the various embodiments can be adjusted to a higher or lower value, as desired, depending on the intending application.

Each of the various layers, including the light transmissible layer, the substrate, the optional base coat and the optional antistatic coatings are discussed in detail below.

The light transmissible layer is of a multi-layer construction comprising at least one pair of polymer layer and a TCO layer. If more than one pair is used, the polymer layer alternates with the TCO layer such that the pattern would be polymer/TCO/polymer/TCO and so on. The polymer layer provides a smooth surface upon which the TCO layer can be deposited. And, it protects the TCO layer from abrasion and from potential rough handling of the packaging material during processing or in use. As stated above, unlike the prior art, the light transmissible layer does rely on the use of a metalized conductive layer.

As further described in detail below in the method of making the inventive article, the polymer layer is formed from any suitable monomer that can be polymerized. Volatilizable acrylate and methacrylate (referred to herein as "(meth)acrylate") monomers are useful, with volatilizable acrylate monomers being preferred. A suitable (meth)acrylate monomer has a minimum number average molecular weight of 150. Another suitable (meth)acrylate monomer has a maximum number average molecular weight of 600. Another way to characterize other suitable (meth)acrylate monomers is in terms of a ratio of the monomer's molecular weight to the number of (meth)acrylate functional groups per molecule. A suitable (meth)acrylate monomer has a minimum ratio of 150 g/mole per (meth)acrylate group. Other suitable (meth)acrylate monomer has a maximum ratio of 600 g/mole per (meth)acrylate group. Fluorinated (meth)acrylate monomers can be used at higher molecular weight or ratio, e.g., at a minimum number average molecular weight of 400 and a maximum number average molecular weight of 3000 or a minimum ratio of 400 g/mole per (meth)acrylate group and a maximum ratio of 3000 g/mole per (meth)acrylate group.

Examples of suitable monomers include, but are not limited to, hexadiol diacrylate; ethoxyethyl acrylate; cyanoethyl (mono)acrylate; isobornyl (meth)acrylate; octadecyl acrylate; isodecyl acrylate; lauryl acrylate; beta-carboxyethyl acrylate; tetrahydrofurfuryl acrylate; dinitrile acrylate; pentafluorophenyl acrylate; nitrophenyl acrylate; 2-phenoxyethyl (meth)acrylate; 2,2,2-trifluoromethyl (meth)acrylate; diethylene glycol diacrylate; triethylene glycol di(meth)acrylate; tripropylene glycol diacrylate; tetraethylene glycol diacrylate; neo-pentyl glycol diacrylate; propoxylated neopentyl glycol diacrylate; polyethylene glycol diacrylate; tetraethylene glycol diacrylate; bisphenol A epoxy diacrylate; 1,6-hexanediol dimethacrylate; trimethylol propane triacrylate; ethoxylated trimethylol propane triacrylate; propylated trimethylol propane triacrylate; tris(2-hydroxyethyl)-isocyanurate triacrylate; pentaerythritol triacrylate; phenylthioethyl acrylate; naphthloxyethyl acrylate; IRR-214 cyclic diacrylate (available from UCB Chemicals, Symrna, Ga.); epoxy acrylate under the product number RDX80094 (available from RadCure Corp., Fairfield, N.J.); and mixtures thereof. A variety of other curable materials can be included in the polymer layer, such as, e.g., vinyl ethers, vinyl mapthalene, acrylonitrile, and mixtures thereof. The polymer layers are typically thin layers. In one exemplary embodiment, the maximum thickness of the polymer layer is 1000 nm. In another exemplary embodiment, the minimum thickness of the polymer layer is 10 nm. Typically, the polymer layer is thicker than 100 nm. If more than one polymer layer is used, the thickness of each polymer layer need not be the same.

With respect to the other portion of the light transmissible layer, i.e., the TCO layer, suitable transparent conductive oxides include indium tin oxide, cadmium oxide, tin oxide, indium oxide, zinc oxide, and magnesium oxide. Indium tin oxide (ITO) is actually tin doped indium oxide, a mixture of indium oxide and tin oxide. Examples of useful cadmium oxide include $CdSn_2O_4$, $CdGa_2O_4$, $CdIn_2O_4$, $CdSb_2O_6$, and $CdGeO_4$. Examples of useful indium oxide include $In_2O_3$:Ga, $GaInO_3(Sn, Ge)$ and $(GaIn)_2O_3$. Examples of useful zinc oxides include $ZnO(Al)$, $ZnO(Ga)$, $ZnSnO_3$, $Zn_2SnO_4$, $Zn_2In_2O_5$ and $Zn_3In_2O_6$. Examples of useful magnesium oxides include $MgIn_2O_4$ and $MgIn_2O_4$—$Zn_2In_2O_5$. In one exemplary embodiment, the maximum thickness of the TCO layer is 200 nm. In another exemplary embodiment, the minimum thickness of the TCO layer is 10 nm. Typically the TCO layer is less than 100 nm thick. If more than one TCO layer is used, the thickness of each TCO layer need not be the same.

The light transmissible layer, with its combination of the polymer layer and the transparent conductive oxide layer, performs several functions. For example, it acts as a barrier so as to protect the electronic component from degradation due to oxygen and moisture vapor. The TCO layer is conductive and can dissipate static electricity that may be present on the packaging material. It also protects against the damaging effects of electrostatic discharges and electric fields.

The light transmissible layer allows for inspection of the electronic component contained therein. The TCO layer is an oxide and it has a higher refractive index than the polymer layer. The light transmission of the finished packaging material can be controlled by varying the number of the polymer layer and the TCO layer used. In one embodiment, a combination of an acrylate as the polymer layer and an indium tin oxide as the TCO layer has a refractive index of 1.45 and 2.0 respectively.

The light transmissible layer is a substantially continuous layer. That is the light transmissible layer is intended to cover the surface area of the substrate with a continuous coating and not intended to be discrete, non-contiguous particles. One skilled in the art will recognize, however, that the preparation of a substantially continuous coating may leave occasional defects, typically in the microscopic level, in the light transmissible layer.

The substrate is a puncture/penetration resistant film. That is, the substrate has the ability to prevent damage to and/or destruction of the film by sharp edged objects. ASTM F 1306, "Standard Test Method for Slow Rate Penetration Resistance of Flexible Barrier Films and Laminates" or MIL-STD-3010, Test Method 2065 "Puncture Resistance" are exemplary test methods that can be used to determine the puncture/penetration resistance of a film. By using these test methods, one can determine the puncture/penetration resistance of the substrate and determine if the substrate would be appropriate for the intended application.

In one embodiment, the puncture resistant film is a polymeric film. Examples of useful polymeric puncture resistant films include polyesters such as polyethylene terephthalate (PET), polypropylene (PP), polyethylene napthalate (PEN), polyether sulfone (PES), polycarbonate, polyestercarbonate, polyetherimide (PEI), polyarylate (PAR), polymers with trade name ARTON (available from the Japanese Synthetic Rubber Co., Tokyo, Japan), polymers with trade name AVATREL (available from the B.F. Goodrich Co., Brecksville, Ohio), polyethylene-2,6-naphthalate, polyvinylidene difluoride, polyphenylene oxide and polyphenylene sulfide. Also useful are the thermoset polymers such as polyimide, polyimide benzoxazole, polybenzoaxozole and cellulose derivatives.

A heat sealable layer may or may not be part of the substrate. For example, in FIG. 1, second film 16b is a heat sealable polyethylene film and is part of the substrate, i.e., the heat sealable film is part of the puncture resistant film. In FIG. 2, however, heat sealable film 27 does not form part of the substrate, which is denoted by reference number 26. In one aspect, the heat sealable film allows for formation of packaging envelops or bags that can be constructed by applying heat and pressure to the packaging material. The heat sealable material is a polymer. Suitable heat sealable polymers include polyethylene, polyethylene acrylic acid, polyethylene vinyl acetate, and any other heat sealable polymers that can be formed as a film.

In one exemplary embodiment, the maximum thickness of the substrate layer, whether it contains the heat sealable film or not, is 0.26 mm (0.010 inch). Typically, the thickness of the substrate is 0.13 mm (0.005 inch). One skilled in the art will recognize, however, that the thickness of the substrate depends upon the intended application for the packaging material. If high puncture resistance is required for the packaging material, because, e.g., the electronic component to be packaged contains sharp edges, thicker substrate materials will be used. In order for the overall packaging material to be light transmissible, the substrate material also needs to be light transmissible, and, in general, the higher the transparency value, the better.

If desired, a smoothing base coat layer may be deposited on the side of the substrate where the TCO layer will eventually be deposited. Thus, if used, the base coat will be sandwiched between the substrate and the TCO layer. Using the base coat layer over the substrate provides a surface for nucleation of the TCO. In one aspect, the base coat functions to smooth over the surface roughness present in the substrate thereby imparting, among other features, good optical quality to the packaging material. Suitable base coat materials are those described for the polymer layer above.

If desired, an antistatic coating can be used as the inner most layer, i.e., the layer exposed to the electronic component and/or the outermost layer, i.e., the layer exposed to the atmosphere. Any antistatic material can be used in the present invention. Suitable antistatic materials include anionics, cationics, non-ionics, and inherently conductive polymers. A commercially available antistat material is Cyastat 609, available from Cytec Industries, West Patterson, N.J.

In brief summary, one exemplary process for making the inventive packaging material can be described in the following manner. Inside a vacuum chamber, which has been evacuated to the appropriate pressure, resides a substrate source spool and a substrate take up spool, the latter winding up the substrate that has been coated at least with the polymer layer and the TCO layer. The vacuum pulled in the chamber is less than 0.001 atmosphere (less than 1 millibar). Typically, the vacuum pulled will be $10^{-4}$ to $10^{-5}$ Torr. Between the source spool and the take up spool, the substrate travels around a rotating drum, which may be cooled to a desired temperature, such as the temperature of the particular monomer used. As the substrate travels around the rotating drum, it will be exposed to various evaporators and curing means. If a base coating is used, the substrate, with the desired side to be coated exposed, will encounter a monomer evaporator where the base coat monomer can be deposited on to the substrate. The deposited monomer then can be cured using a curing means, such as for example a radiation or electron beam device to form the base coat. As the substrate, now coated with the base coat continues to travel around the rotating drum, the substrate encounters a second evaporation system where the TCO can be deposited over the base coat. The base coat, TCO coated substrate then encounters a third evaporator where a monomer can be deposited and then subsequently cured to form the polymer layer. If desired, additional evaporators to deposit additional TCO layers and polymer layers can be used to form additional TCO/polymer layers. The process of forming the specific layers is discussed below.

The TCO layer may be prepared by a variety of methods, such as those described in U.S. Pat. No. 5,725,909 (Shaw et al.) and U.S. Pat. No. 5,440,446 (Shaw et al.). The TCO layer can typically be prepared by reactive evaporation, reactive sputtering, chemical vapor deposition, and plasma enhanced chemical vapor deposition.

The polymer layer and the base coat, if used, may be prepared by conventional coating methods such as roll coating (e.g., gravure roll coating) or spray coating (e.g., electrostatic spray coating) the monomer, and then crosslinking by using, e.g., ultraviolet light radiation. The polymer may also be prepared by flash evaporation of the monomer, vapor deposition, followed by crosslinking, as described in the following U.S. Pat. No. 4,842,893 (Yializis et al.); U.S. Pat. No. 4,954,371 (Yializis); U.S. Pat. No. 5,032,461 (Shaw et al.); U.S. Pat. No. 5,440,446 (Shaw et al.); U.S. Pat. No. 5,725,909 (Shaw et al.); U.S. Pat. No. 6,231,939 (Shaw et al.); U.S. Pat. No. 6,045,864 (Lyons et al.); and U.S. Pat. No. 6,224,948 (Affinito), herein incorporated by reference.

The antistatic coating, if used, may be prepared by the conventional coating methods described above for the polymer layer. Typically, the antistatic coating will be prepared as an independent step from the vacuum process described above for the TCO and polymer layers.

There are various ways that one can assemble the packaging material described above to form a package for storing an electronic component. For example, one method of assembling a bag would be to provide the packaging film to a desired width that coincides with the desired width of the bag. The length of the packaging film could be about twice the desired width. Then, one can fold the film lengthwise to produce a desired size bag and seal two of the edges of the film to form an envelope (the fold serving as the third closed side of the envelope). Sealing is typically done using heat and pressure for a period of time. After the electronic component has been deposited in the bag, the third edge can also be sealed.

What is claimed is:

1. A material comprising:
   (a) a puncture resistant film comprising a polyester layer disposed on a polyethylene layer; and
   (b) a substantially continuous metal free light transmissible, static dissipative layer disposed on the polyester layer, wherein the light transmissible layer comprises at least two pairs of acrylate polymer layer and transparent conductive oxide layer, and wherein the light transmissible layer is not a metalized layer.

2. A The material of claim 1 further comprising a heat sealable layer disposed on the light transmissible layer or on the second surface of the puncture resistant film.

3. The material of claim 1, wherein the heat sealable layer is selected from the group consisting of polyethylene, polyethylene acrylic acid, and polyethylene vinyl acetate.

4. The material of claim 1 further comprising a base coat sandwiched between the puncture resistant film and the light transmissible layer such that the base coat contacts the transparent conductive oxide layer.

5. The material of claim 1 wherein the transparent conductive oxide layer is selected from the group consisting of indium tin oxide, cadmium oxide, tin oxide, indium oxide, zinc oxide, and magnesium oxide.

6. The material of claim 1 wherein the polymer layer is formed from volatilizable (meth)acrylate monomer.

7. The material of claim 1 exhibiting a moisture vapor transmission rate across the (cross-section of) article is less than 0.05 g per 100 in$^2$ per 24 hour.

8. The material of claims 1 exhibiting a transparency of at least 40% as measured by ASTM D-1746.

9. The material of claim 1 exhibiting a transparency of at least 80% as measured by ASTM D-1746.

10. The materials of claim 1 further comprising an antistatic coating disposed on the puncture resistant film.

* * * * *

UNITED STATES PATENT AND TRADEMARK OFFICE
CERTIFICATE OF CORRECTION

PATENT NO. : 7,052,772 B2  Page 1 of 1
APPLICATION NO. : 10/640912
DATED : May 30, 2006
INVENTOR(S) : Andrew C. Lottes It is certified that error appears in the above-identified patent and that said Letters Patent is hereby corrected as shown below:

Title Page, column 2, (U.S. Patent Documents), line 11, after "6,351,068" delete "B1" and insert -- B2 --, therefore.

Column 8, line 24, in claim 2, before "The" delete "A".

Column 8, line 27, in claim 3, delete "claim 1," and insert -- claim 2, --, therefore.

Column 8, line 48, (Approx.), in claim 10, delete "materials" and insert -- material --, therefore.

Signed and Sealed this

Twenty-first Day of November, 2006

JON W. DUDAS
*Director of the United States Patent and Trademark Office*